Sept. 28, 1954 W. J. CASEY III 2,690,242
EMERGENCY BRAKE BEAM SUPPORT
Filed Jan. 4, 1951
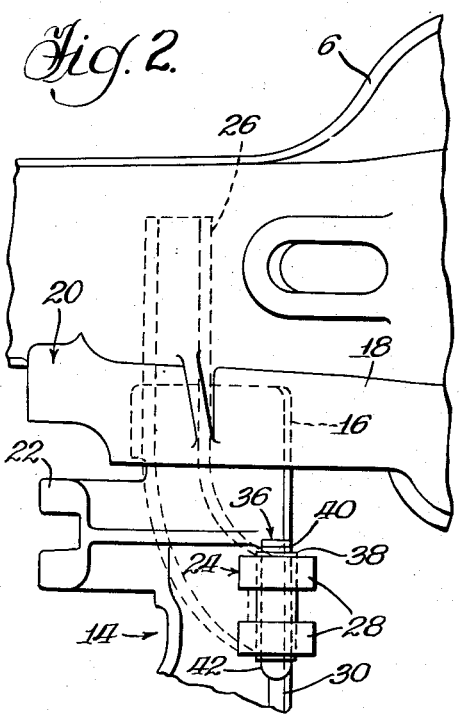
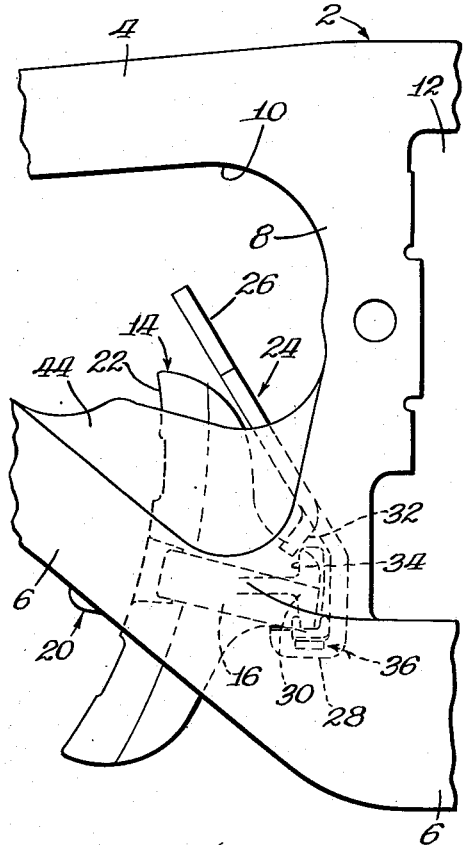
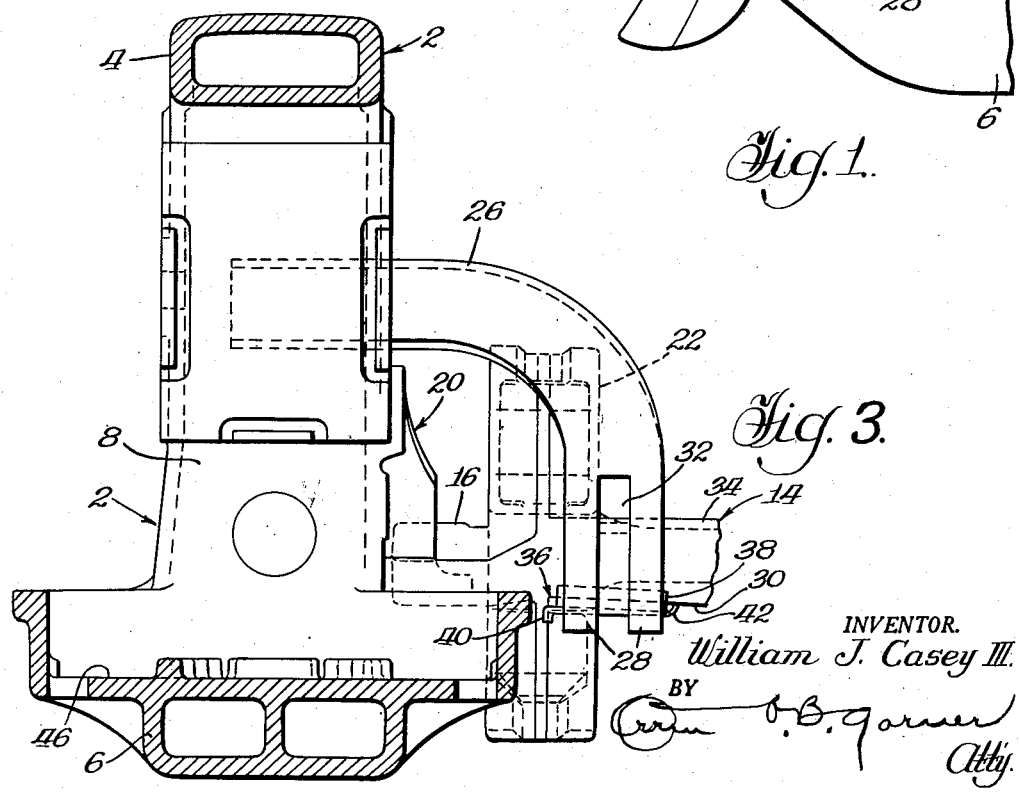
INVENTOR.
William J. Casey III
BY
Atty.

Patented Sept. 28, 1954

2,690,242

UNITED STATES PATENT OFFICE 2,690,242

EMERGENCY BRAKE BEAM SUPPORT

William J. Casey III, Chicago, Ill., assignor to American Steel Foundries, Chicago, Ill., a corporation of New Jersey Application January 4, 1951, Serial No. 204,403

3 Claims. (Cl. 188—210)

This invention relates to brakes and more particularly to an emergency brake beam support for a brake beam such as is commonly utilized in a railway freight car truck.

A primary object of the invention is to devise a simple and economical emergency support which projects into the window of a conventional truck frame for engagement with the lower margin of the window to limit downward movement of the beam in the event that its conventional support means fail in service.

A further object of the invention is to devise an emergency support which may be readily attached and detached with respect to a conventional beam.

The foregoing and other objects and advantages of the invention will become apparent from a consideration of the following specification and the accompanying drawing, wherein:

Figure 1 is a fragmentary side elevational view of a freight car truck embodying the invention;

Figure 2 is a bottom plan view of the structure shown in Figure 1, and;

Figure 3 is a side elevational view taken from the right of Figure 1 with the truck frame broken away to clarify the illustration.

Describing the invention in detail, the truck frame, generally designated 2, is of conventional form and comprises a compression member 4 and a tension member 6 connected adjacent each end of the frame by a strut or column 8 defining a window opening 10 and a bolster opening 12, the latter being adapted to receive a bolster (not shown) which is spring supported in the usual manner from the tension member 6 at the bottom of the bolster opening 12.

A brake beam, generally designated 14, which may be of any conventional form, is supported at each end thereof by a lug 16 slidably seated on a ledge 18 of a conventional brake beam support bracket generally designated 20 which may be of the form shown and described in U. S. Letters Patent No. 2,508,020, issued May 16, 1950, to Flesch et al. The brake beam 14 is provided adjacent each end thereof with a brake head 22 adapted to support associated brake shoe means (not shown) for braking engagement with the truck wheel (not shown) in the usual manner.

Attached to the beam 14, preferably adjacent each brake head 22 thereof, is a novel emergency support generally designated 24 and comprising an arm 26 projecting into the window opening 10 and extending arcuately inboardly therefrom, as best seen in Figure 3, for connection to spaced fingers 28, adapted to underlie a flange 30 of the beam 14. The arm 26 is also connected to another finger 32 diverging downwardly therefrom and engageable with the upper forward edge of a brake beam flange 34.

A wedge type retainer key, generally designated 36, is provided for interlocking the emergency support 24 with the brake beam flanges 30 and 32, said key comprising in the preferred form illustrated, an upper U-shaped member 38 embracing the lower end of the flange 30 and also comprising a lower wedge member 40 embraced by the fingers 28 and wedged between said fingers and the member 38, as for example, by a hammer. The inboard end of the member 40 is preferably peened over as at 42 in the wedged position thereof to prevent accidental disassembly of the key 36 due to the intense vibrations of railway service.

As best seen in Figure 1, the arm 26 is disposed in a diagonal plane extending upwardly from adjacent the lower corner of the bolster opening 12 toward the end of the frame and extending arcuately outboardly from the fingers 28, as best seen in Figure 3, into the window opening 10, whereby in the event of accidental disengagement of the lug 16 from the bracket 20, downward movement of the beam 14 is positively limited by engagement of the arm 26 with a web 44 formed as a gusset between the tension member 6 and column 8 within the window opening 10. It is noted that the upper edge of the gusset 44, beneath the arm 26, is at a level above that of the tension member spring seat 46, at least approximately one-half the distance between the bottom of the compression member 4 and the spring seat 46, as will be readily seen by a comparison of Figures 1 and 3. This novel arrangement results in interengagement of the arm 26 and web 44 to prevent dropping of the brake head 14 substantially below the lower level of the tension member 6 beneath its spring seat 46.

I claim:

1. A railway brake beam having a brake head and a lug outboardly thereof for supporting the beam from an associated frame, an arm having spaced fingers underlying a portion of the beam in an area spaced from the brake head and another finger overlying another portion of the beam in vertical alignment with said first mentioned fingers, wedge means comprising a removable wedge interposed between said spaced fingers and the first-mentioned portion of the beam to secure said arm on the beam, said arm extending outboardly of the lug to afford emergency support for the beam.

2. A railway brake beam according to claim 1, wherein the arm is disposed to extend upwardly and arcuately outboardly whereat it is received within a window formed in said frame.

3. In a railway car truck having a frame with a window opening and a brake head carrying beam primarily and slidably supported by a ledge on the frame below the level of the window opening; the combination of an arm connected directly to the beam inboardly of the head, the connection between the arm and the beam comprising a plurality of fingers on the arm, a pair of said fingers being spaced from each other and extending below the beam and wrapped around the underside thereof, a U-shaped member interposed between the underside of the beam and said pair of fingers, another of said fingers overlying the upper side of said beam, said other finger being located intermediate the spaced fingers when considered in vertical relation, a removable wedge member interposed between the U-shaped member and the pair of spaced fingers operative to urge said pair of fingers and said arm downwardly bringing said other finger into tight engagement with said upper side of said beam, said arm extending upwardly and obliquely relative to the vertical from said fingers and curving outboardly of the truck to extend into said window whereby said arm may support said beam from said frame in the event of failure of said primary support.

References Cited in the file of this patent

UNITED STATES PATENTS

| Number | Name | Date |
| --- | --- | --- |
| 1,923,120 | Shafer | Aug. 22, 1933 |
| 1,969,923 | Carothers | Aug. 14, 1934 |
| 2,197,399 | Stillwagon | Apr. 16, 1940 |